US011878888B2

(12) United States Patent
Shirai et al.

(10) Patent No.: US 11,878,888 B2
(45) Date of Patent: Jan. 23, 2024

(54) POST-PROCESSING APPARATUS AND IMAGE FORMING APPARATUS

(71) Applicant: FUJIFILM BUSINESS INNOVATION CORP., Tokyo (JP)

(72) Inventors: Masakazu Shirai, Yokohama (JP); Koji Kawano, Yokohama (JP); Takayuki Fukamachi, Yokohama (JP)

(73) Assignee: FUJIFILM Business Innovation Corp., Tokyo (JP)

(*) Notice: Subject to any disclaimer, the term of this patent is extended or adjusted under 35 U.S.C. 154(b) by 5 days.

(21) Appl. No.: 17/379,346

(22) Filed: Jul. 19, 2021

(65) Prior Publication Data

US 2022/0259002 A1 Aug. 18, 2022

(30) Foreign Application Priority Data

Feb. 18, 2021 (JP) ................................ 2021-024354

(51) Int. Cl.
*B65H 37/06* (2006.01)
*B41F 13/60* (2006.01)

(52) U.S. Cl.
CPC ............ *B65H 37/06* (2013.01); *B41F 13/60* (2013.01)

(58) Field of Classification Search
CPC ........ B65H 45/18; B65H 37/06; B65H 45/22; B26D 7/2614; B26D 3/085
See application file for complete search history.

(56) References Cited

U.S. PATENT DOCUMENTS

2006/0055100 A1* 3/2006 Suzuki ...................... B42C 1/12 270/45
2008/0001338 A1 1/2008 Kotani
2008/0318752 A1 12/2008 Oshiro et al.
2011/0301008 A1* 12/2011 Shibasaki .......... G03G 15/6573 493/405
2018/0056538 A1* 3/2018 Watanabe ............ B26D 1/0006

FOREIGN PATENT DOCUMENTS

JP 2006-001659 A 1/2006
JP 2011-241021 A 12/2011
WO 2020-056010 A1 3/2020

OTHER PUBLICATIONS

Dec. 8, 2022 Extended Search Report issued in European Patent Application No. 21189946.3.
Sep. 12, 2023 Office Action issued in European Patent Application No. 21 189 946.3.

* cited by examiner

*Primary Examiner* — Jennifer Bahls
(74) *Attorney, Agent, or Firm* — Oliff PLC

(57) ABSTRACT

A post-processing apparatus includes a blade that is to be pressed against a recording medium at a folding position where the recording medium is to be folded, and a support portion that supports the blade, the support portion includes a movable body to which the blade is fixed and that moves together with the blade and an insertion portion that is inserted into the movable body, and the insertion portion and one surface of the movable body are pressed each other.

12 Claims, 9 Drawing Sheets

SECOND EXEMPLARY EMBODIMENT

FIRST EXEMPLARY EMBODIMENT

COMPARATIVE EXAMPLE

SECOND EXEMPLARY EMBODIMENT

POST-PROCESSING APPARATUS AND IMAGE FORMING APPARATUS

CROSS-REFERENCE TO RELATED APPLICATIONS

This application is based on and claims priority under 35 USC 119 from Japanese Patent Application No. 2021-024354 filed on Feb. 18, 2021.

BACKGROUND

1. Technical Field

The present invention relates to a post-processing apparatus and an image forming apparatus.

2. Related Art

JP-A-2006-1659 discloses a sheet processing apparatus (hereinafter referred to as a post-processing apparatus) that stacks sheets sequentially fed one by one, binds centers of plural stacked sheets, and folds the bound sheet bundle into two, the sheet processing apparatus including: an end guide that is movable in a sheet feeding direction and that stacks the sheets by damming up leading ends of the sheets sequentially fed one by one; a stapler that binds centers of the plural sheets stacked by the end guide by a staple; a sheet folding machine that presses a blade against the center of the sheet bundle after being bound by the stapler, folds the sheet bundle, feeds the sheet bundle into a roller, and holds the sheet bundle between the rollers to fold the sheet bundle into two; a home sensor that detects whether there is the end guide at a home position set on an upstream side in the sheet feeding direction within a movement range of the end guide; and a control unit that causes the end guide positioned at the home position to move to a first position corresponding to a size of the sheet to stack the sequentially fed sheet, causes the end guide to move to a second position according to a size of the sheet to cause the stapler to perform a binding processing, further causes the end guide to move to a third position corresponding to a size of the sheet to cause the sheet folding machine to perform the folding processing, and causes the end guide to move to the home position. The control unit causes the end guide positioned at the third position to start moving to the home position while the sheet folding machine is being caused to perform the folding processing.

SUMMARY

Aspects of non-limiting embodiments of the present disclosure relate to providing a post-processing apparatus capable of preventing a variation in a folding position where a recording medium is folded.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a post-processing apparatus including a blade that is to be pressed against a recording medium at a folding position where the recording medium is to be folded, and a support portion that supports the blade, wherein the support portion includes a movable body to which the blade is fixed and that moves together with the blade, and an insertion portion that is inserted into the movable body, and the insertion portion and one surface of the movable body are pressed each other.

BRIEF DESCRIPTION OF THE DRAWINGS

Exemplary embodiments of the present invention will be described in detail based on the following figures, wherein.

DETAILED DESCRIPTION

Next, exemplary embodiments of the present invention will be described in detail with reference to the drawings.

Figure 1:
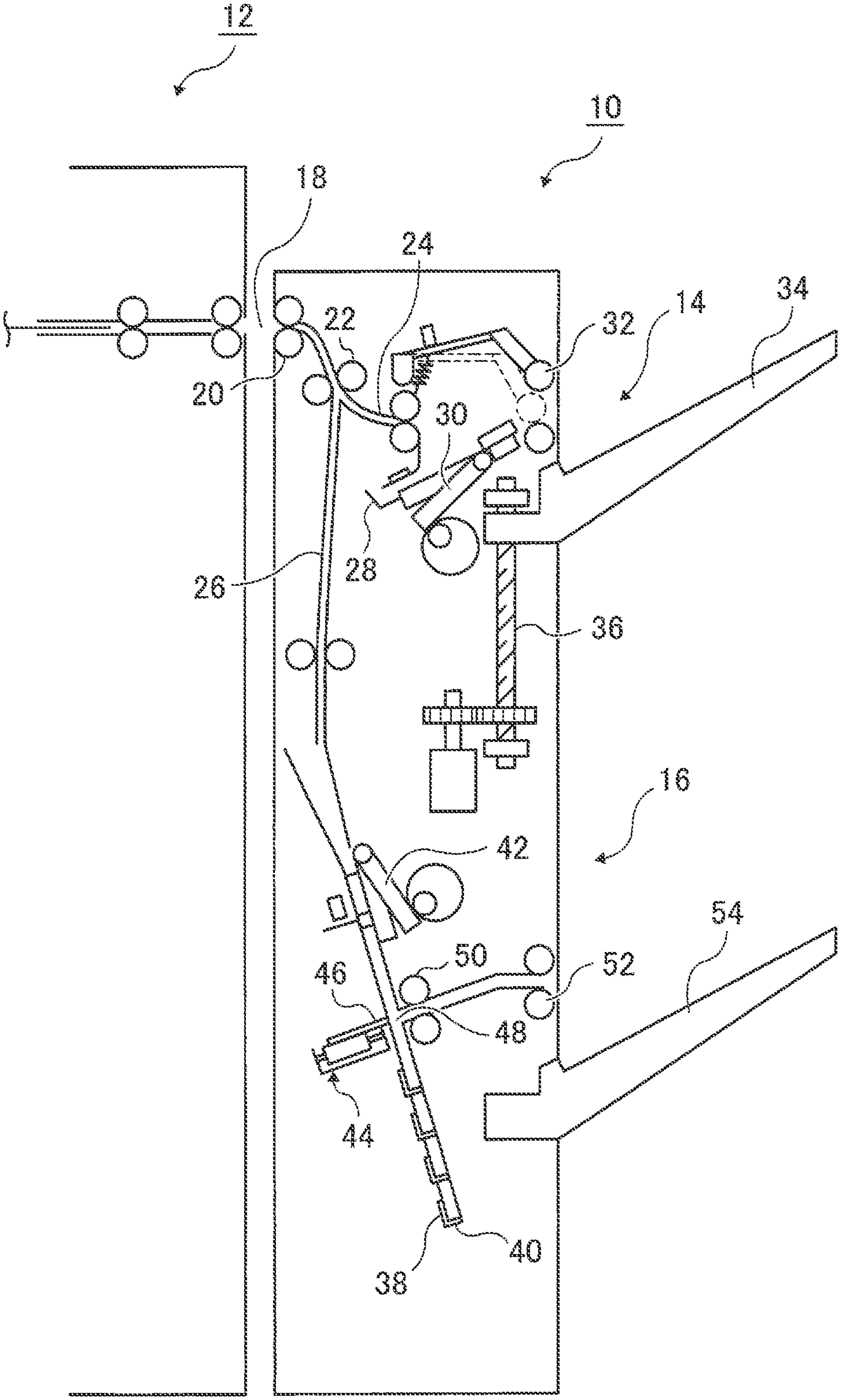
FIG. 1 is a sectional view of an image forming apparatus including a post-processing apparatus according to a first exemplary embodiment of the present invention.

FIG. 1 shows an image forming apparatus including a post-processing apparatus 10 according to a first exemplary embodiment of the present invention. The image forming apparatus includes an image forming unit 12 that forms an image on a recording medium, and the post-processing apparatus 10 is connected to a side surface of the image forming unit 12.

The post-processing apparatus 10 includes a side stitching processing unit 14 and a saddle stitching processing unit 16.

The side stitching processing unit 14 stacks the recording media sequentially fed one by one, and binds end portions of the plural stacked recording media. The saddle stitching processing unit 16 stacks the recording media sequentially fed one by one, binds centers of the plural stacked recording media, and folds a bundle of the plural bound recording media into two.

A recording medium carry-in port 18 is formed in a side surface of the post-processing apparatus 10 connected to the image forming unit 12. The recording medium on which the image is formed by the image forming unit 12 is carried into the post-processing apparatus 10 through the recording medium carry-in port 18. First feed members 20 and second feed members 22 are provided on a downstream side of the recording medium carry-in port 18. A downstream side of the second feed member 22 is divided into a first feed path 24 and a second feed path 26. The first feed path 24 and the second feed path 26 are selected by a switching member (not shown), and the recording medium is fed to the side stitching processing unit 14 via the first feed path 24, and is fed to the saddle stitching processing unit 16 via the second feed path 26.

The side stitching processing unit 14 is provided with an side stitching temporary accumulation portion 28. The recording medium is temporarily accumulated in the side stitching temporary accumulation portion 28. In addition, the side stitching processing unit 14 is provided with a side stitching stapler 30 that ejects a staple to the temporarily accumulated recording medium. The recording medium on which the staple has been ejected by the side stitching stapler 30 is discharged to a side stitching discharge portion 34 by a bundle discharge device 32. A position adjuster 36 is connected to the side stitching discharge portion 34, and the position adjuster 36 adjusts a position of the side stitching discharge portion 34 so that an upper surface of the recording medium bundle discharged to the side stitching discharge unit 34 is at the same position.

The saddle stitching processing unit 16 is provided with a saddle stitching temporary accumulation portion 38. The recording medium is temporarily accumulated in the saddle stitching temporary accumulation portion 38. A holder 40, which abuts against and holds a lower end of the recording medium, is formed at the lower end of the saddle stitching temporary accumulation portion 38. In addition, the saddle stitching processing unit 16 is provided with a saddle stitching stapler 42 that ejects a staple to the temporarily accumulated recording medium. The saddle stitching stapler 42 is configured to eject a staple at a center portion of the recording medium when the holder 40 of the saddle stitching temporary accumulation portion 38 is at a higher position.

The saddle stitching processing unit 16 is provided with a folding device 44. The folding device 44 includes a blade 46. The blade 46 reciprocates in a direction orthogonal to the recording medium. When the holder 40 of the saddle stitching temporary accumulation portion 38 is moved downward and the center of the recording medium is positioned at a position of the blade 46, the blade 46 presses against the center of the recording medium to fold the recording medium.

An opening portion 48 is formed on the saddle stitching temporary accumulation portion 38 in a tip end direction of the blade 46. Further, folding rolls 50 are disposed ahead of the opening portion 48. The folding rolls 50 sandwich the folded recording medium in an upper-lower direction, and press the recording medium between the folding rolls 50. Then, the folded recording medium is discharged to the saddle stitching discharge portion 54 by the discharge rolls 52.

Figure 2:
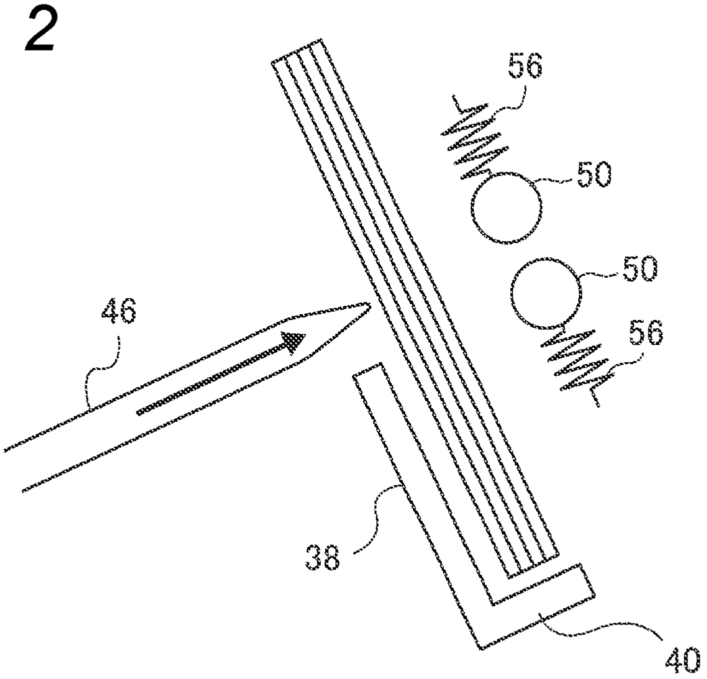
FIG. 2 is a side view showing a state immediately before a folding process of a recording medium is performed according to the first exemplary embodiment of the present invention.
Figure 3:
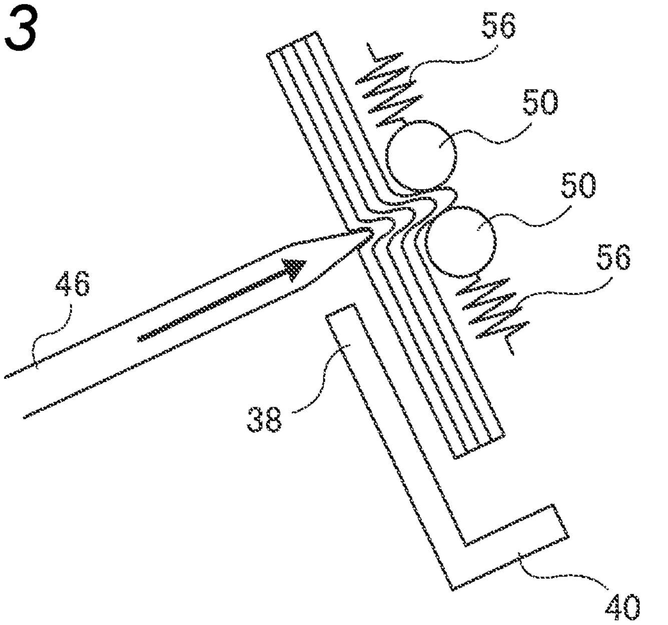
FIG. 3 is a side view showing a state in which the folding process of the recording medium is performed according to the first exemplary embodiment of the present invention.

As shown in FIG. 2, when the blade 46 presses against the recording media and moves, as shown in FIG. 3, folded front ends of the recording media are sandwiched between the folding rollers 50, and the recording media is pressed in the upper-lower direction and folded by the folding rolls 50 due to pressing members 56.

Next, the folding device 44 will be described in detail with reference to FIGS. 4 to 8.

Figure 7:
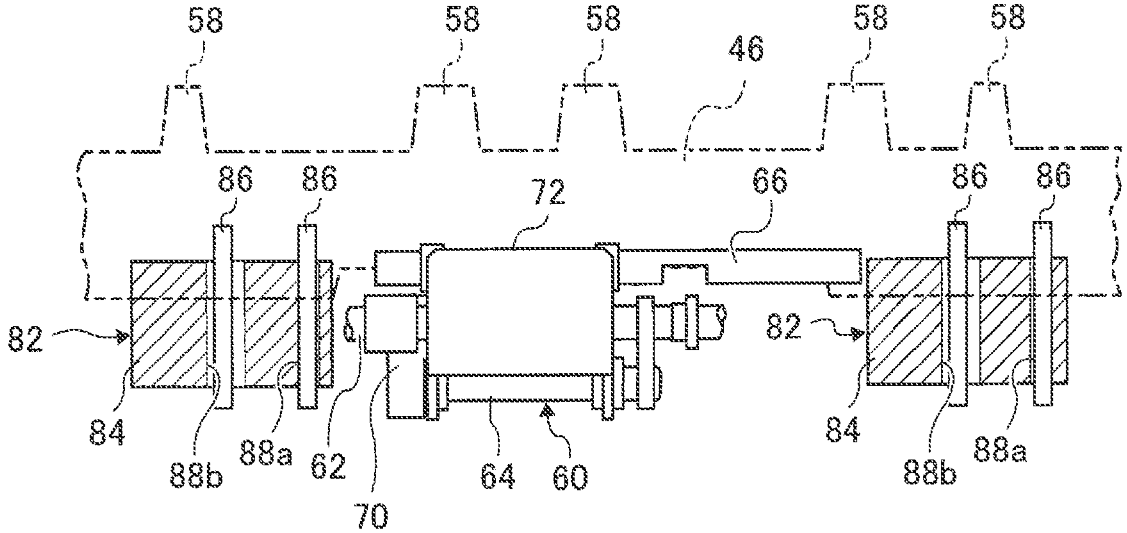
FIG. 7 is a sectional view of the periphery of the support portion as viewed from above according to the first exemplary embodiment of the present invention.

As shown in FIG. 7, the blade 46 is long in a sub-scanning direction of the recording medium, and includes plural protruding portions 58 toward the recording medium. In addition, the blade 46 is fixed to two movable bodies 84, which will be described later, and is connected to a crank mechanism 60. The crank mechanism 60 includes a first shaft 62, a second shaft 64 provided apart from the first shaft 62, and a third shaft 66 fixed to the blade 46. The first shaft 62 and the second shaft 64 are connected via a first link 70, and the second shaft 64 and the third shaft 66 is connected via a second link 72.

When the first shaft 62 is rotated, the second shaft 64 rotates around the first shaft 62, the third shaft 66 moves together with the blade 46 via the second link 72, and the blade 46 is pressed against the recording medium.

Figure 5:
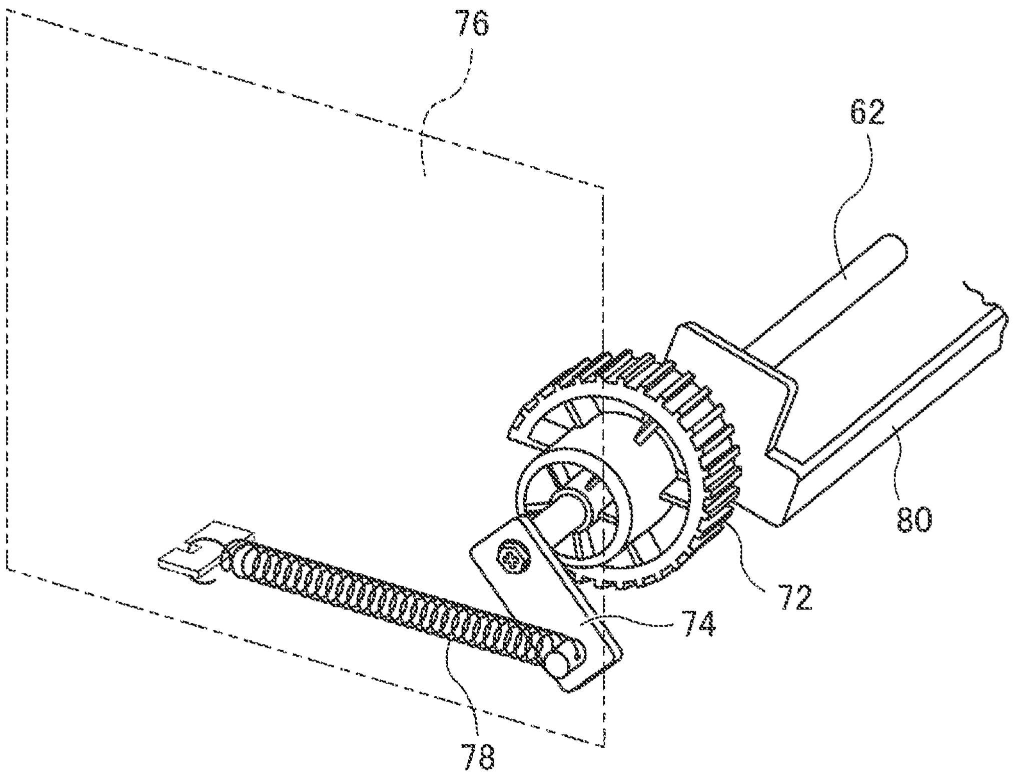
FIG. 5 is a perspective view showing a periphery of a drive unit of the folding device according to the first exemplary embodiment of the present invention.

As shown in FIG. 5, the first shaft 62 is an input shaft, and a drive unit 72 is provided at an end portion of the first shaft 62 (an end portion in a direction intersecting a folding direction of the recording medium). The drive unit 72 is formed of, for example, a gear, and rotates by receiving a driving force from a motor (not shown). Further, an arm portion 74 is connected to the drive unit 72, and a first urging member 78 is provided between the arm portion 74 and a post-processing apparatus main body 76. When the driving force from the motor is released, the drive unit 72 is, for example, disengaged from a clutch and rotates to an opposite side by the first urging member 78, and the blade 46 is returned to an initial position.

The folding device 44 includes a support frame 80 formed in a rectangular box shape whose upper portion is released and which is long in the sub-scanning direction of the recording medium. Support portions 82 are provided on the support frame 80. The support portions 82 support the blade 46 so as to be movable. The support portions 82 include two movable bodies 84 to which the blades 46 are fixed, and insertion portions 86 each having a circular cross section, two of which are inserted into each of the two movable bodies 84. Each movable body 84 is formed in a rectangular parallelepiped shape, and is formed with two insertion holes **88*a*, 88*b* along in a moving direction of the blade 46, respectively. The insertion portions 86 are inserted into each of the insertion holes 88*a*, 88*b***.

Figure 6:
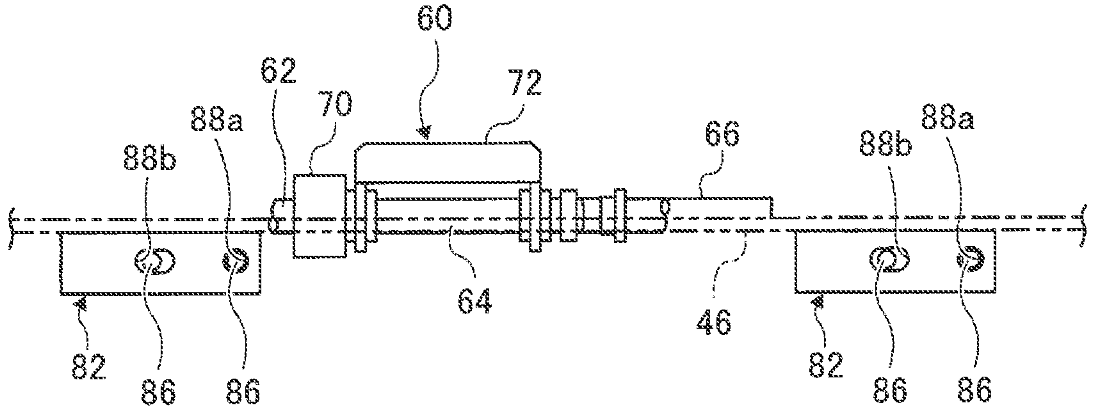
FIG. 6 is a sectional view of a periphery of a support portion as viewed from a side according to the first exemplary embodiment of the present invention.

As shown in FIGS. 6 and 7, one insertion hole **88*a* formed in one movable body 84 has a circular cross section, the other insertion hole 88*b* has an oval cross section, and the insertion portion 86 having a circular cross section is inserted into each of the insertion holes 88*a*, 88*b***.

However, a play due to intersection is formed between the one insertion hole **88*a* and the insertion portion 86**.

Figure 4:
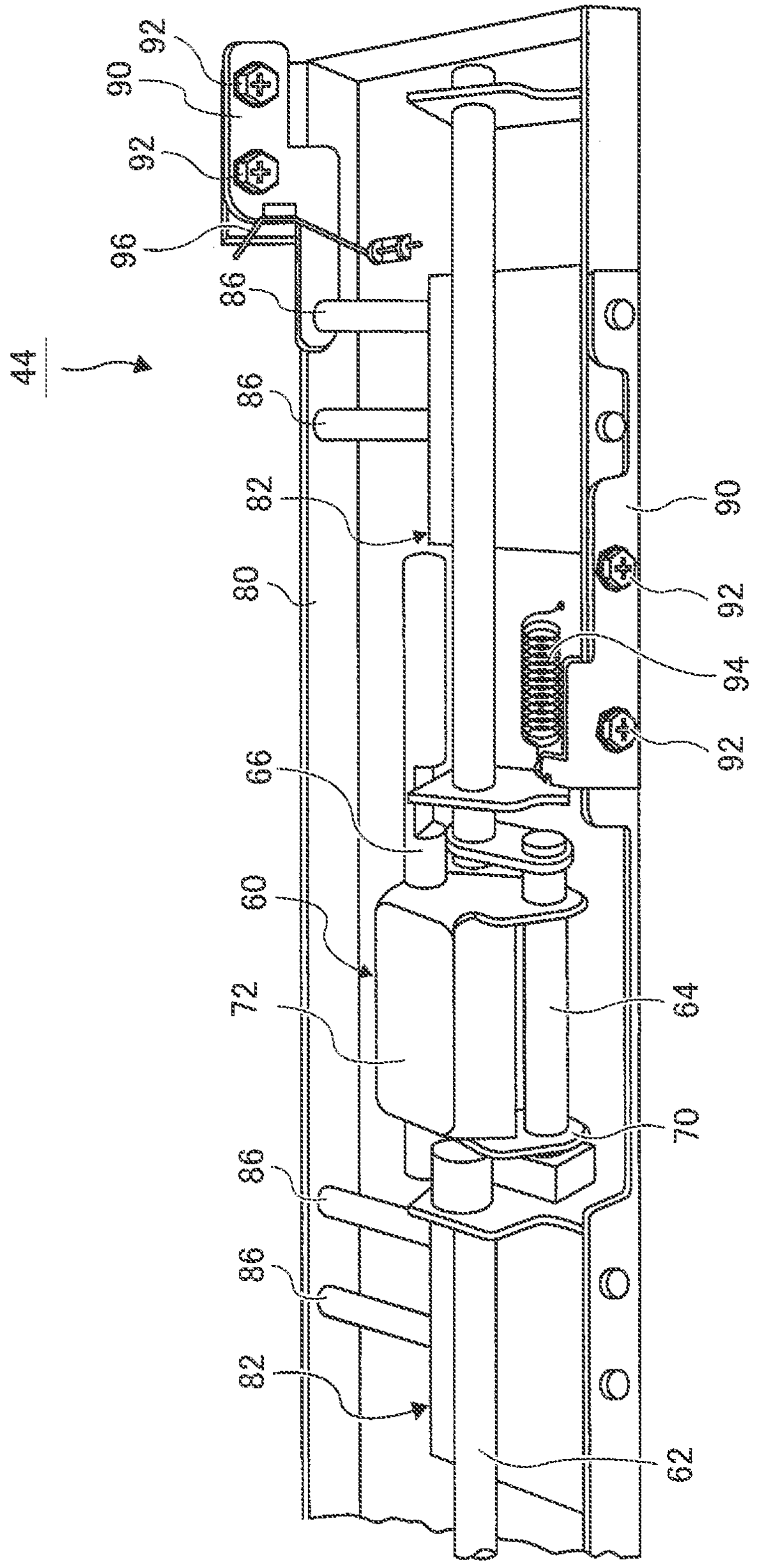
FIG. 4 is a perspective view showing a part of a folding apparatus excluding a blade according to the first exemplary embodiment of the present invention.

As shown in FIG. 4, adjustment members 90 are provided on both side surfaces of the support frame 80 on a counter-drive unit side. The adjustment member 90 is fixed to the support frame 80 by screws 92. A play is provided in a longitudinal direction between a screw hole formed in the support frame 80 and the screw. The insertion portion 86 arranged at an end on the counter-drive unit side is fixed to the adjustment member 90. The other insertion portion 86 is fixed to the support frame 80.

A second urging member 94 is provided between the adjustment member 90 on a front side and the support frame 80, and a third urging member 96 is provided between the adjustment member 90 on a rear side and the support frame 80. The second urging member 94 is, for example, a tension spring, and urges the adjustment member 90 on the front side so as to pull the adjustment member 90 on the front side toward the drive unit side with respect to the support frame 80 (a left side in FIG. 4). In addition, the third urging member 96 is, for example, a linear spring, and urges the adjustment member 90 on the rear side so as to push the adjustment member 90 on the rear side toward the counter-drive unit side with respect to the support frame 80.

Figure 8:
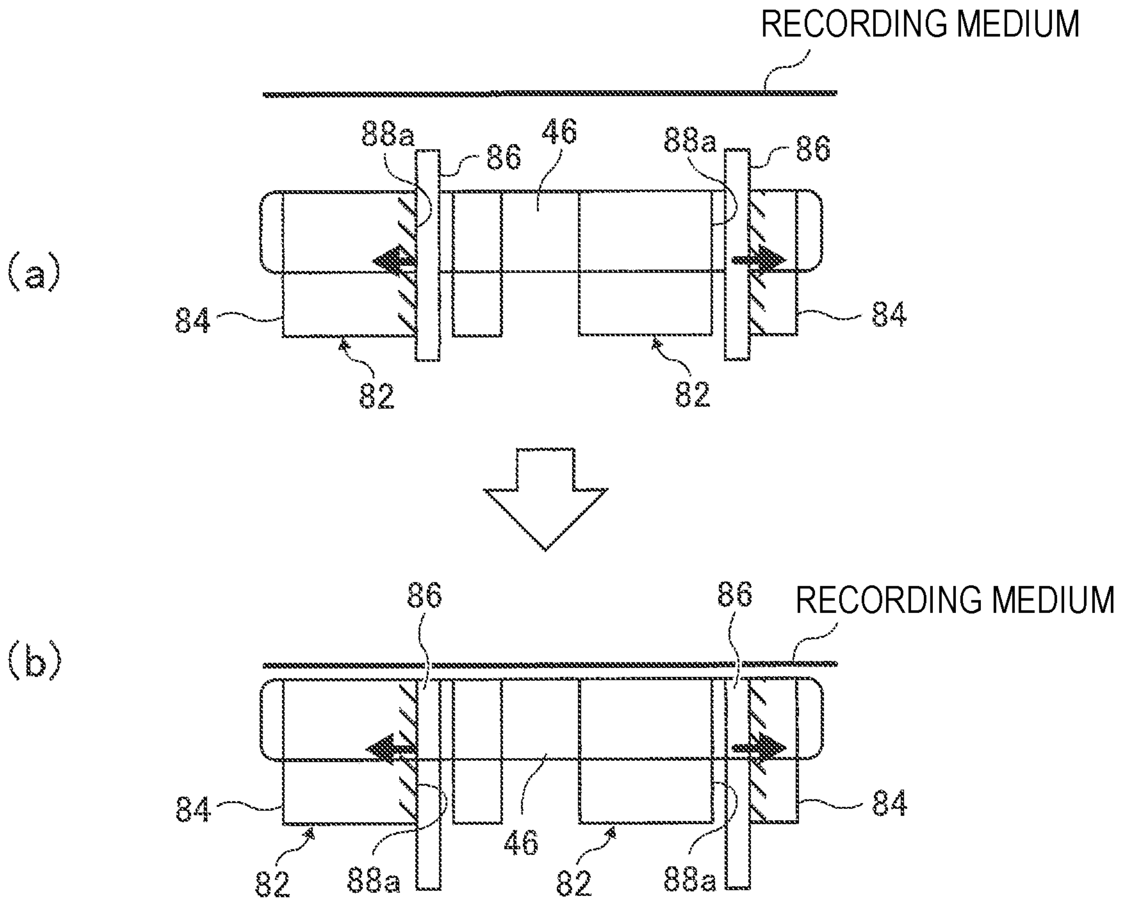
FIG. 8 is a schematic view showing a relationship between a movable body and an insertion portion according to the first exemplary embodiment of the present invention, in which (a) shows a state before start of the folding process of the recording medium, and (b) shows a state at the start of the folding process of the recording medium.

In the above configuration, when the post-processing apparatus 10 is assembled, the second urging member 94 and the third urging member 96 are kept urged before the adjustment members 90 are fixed to the support frame 80 with the screws 92. In this state, as shown in FIG. 8, in the movable body 84 on the counter-drive unit side, the insertion portion 86 is pressed against a surface of the insertion hole 88*a* on the counter-drive unit side, and the play between the insertion portion 86 and the insertion hole 88*a* is eliminated. In addition, in the movable body 84 on the drive unit side, the insertion portion 86 is pressed against a surface of the insertion hole 88*a* on the drive unit side, and similarly, the play between the insertion portion 86 and the insertion hole 88*a* is eliminated. In such a state, the adjustment member 90 is fixed to the support frame 80 by the screws 92.

Figure 9:
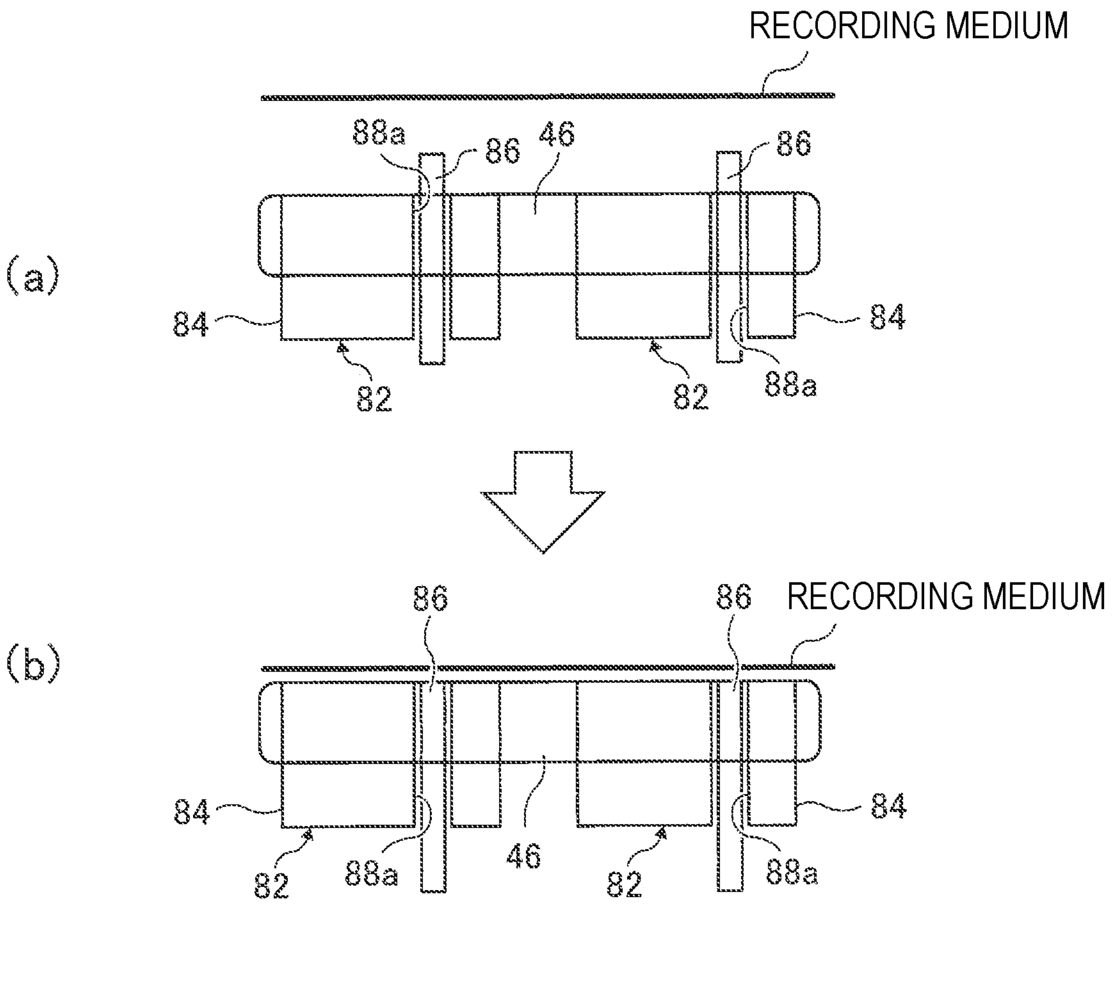
FIG. 9 is a schematic diagram showing a relationship between a movable body and an insertion portion according to a comparative example, in which (a) shows a state before start of a folding process of a recording medium, and (b) shows a state at the start of the folding process of the recording medium.

As described above, since there is no play between the insertion portion 86 and the insertion hole 88*a*, as shown in (b) in FIG. 8, even when the blade 46 is pushed into the recording medium, the driving of the movable body 84 is stabilized and an operation of the blade 46 is also stabilized, as compared with a comparative example shown in FIG. 9.

FIG. 9 shows the comparative example. In this comparative example, there is a play between the insertion portion 86 and the insertion hole 88*a*. When the blade 46 is pushed into the recording medium, the blade 46 receives a reaction force from the recording medium to become unstable in a posture, and causes a variation in the folding position of the recording medium.

Figure 10:
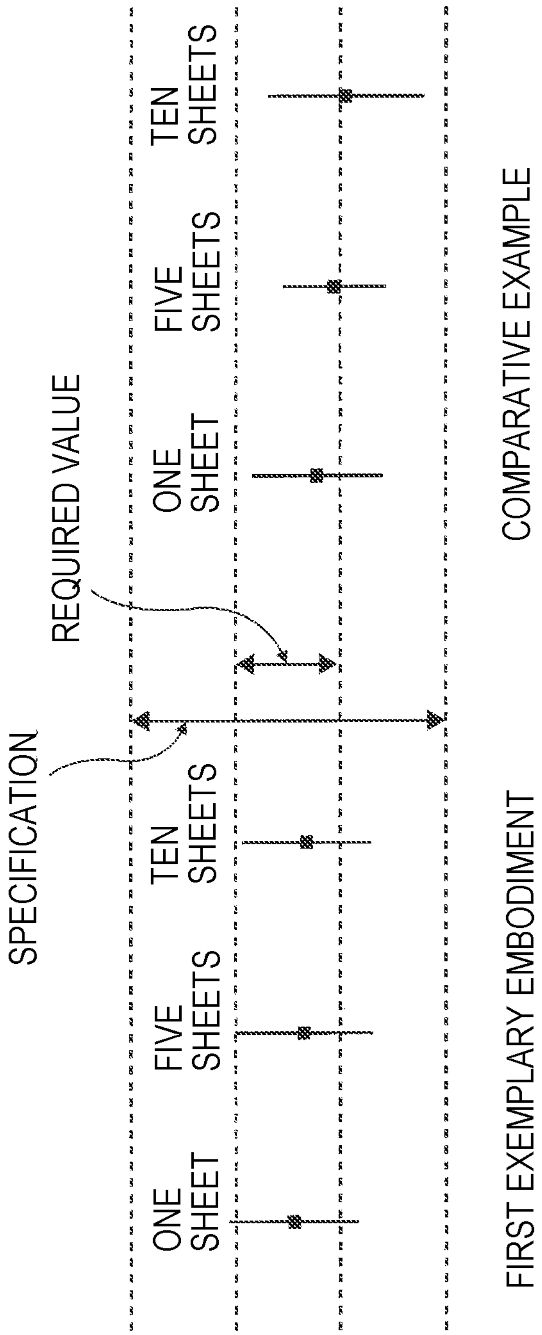
FIG. 10 is a chart in which amounts of folding deviation between the first exemplary embodiment of the present invention and the comparative example are compared.

FIG. 10 shows results of comparing folding deviation between the first exemplary embodiment and the comparative example when the number of recording media is one, five, or ten. Solid lines indicate variation widths, and squares indicate average values of the variation. Although any variation falls within the specification, in the comparative example, a ratio of deviating from a required value is large and the variation is large as compared with the first exemplary embodiment. On the other hand, in the first exemplary embodiment, it is understood that a ratio of deviating from the required value is smaller than that of the comparative example and the variation is stable.

In the first exemplary embodiment, the insertion portion 86 is pressed against the insertion hole 88*a*, but conversely, the movable body 84 may be urged so as to press the insertion hole 88*a* against the insertion portion 86. In addition, a portion where the insertion portion 86 and the insertion hole 88*a* come into contact with each other may be covered with a low friction material having a lower friction coefficient than that of main body materials of the movable body 84 or the insertion portion 86.

Figure 11:
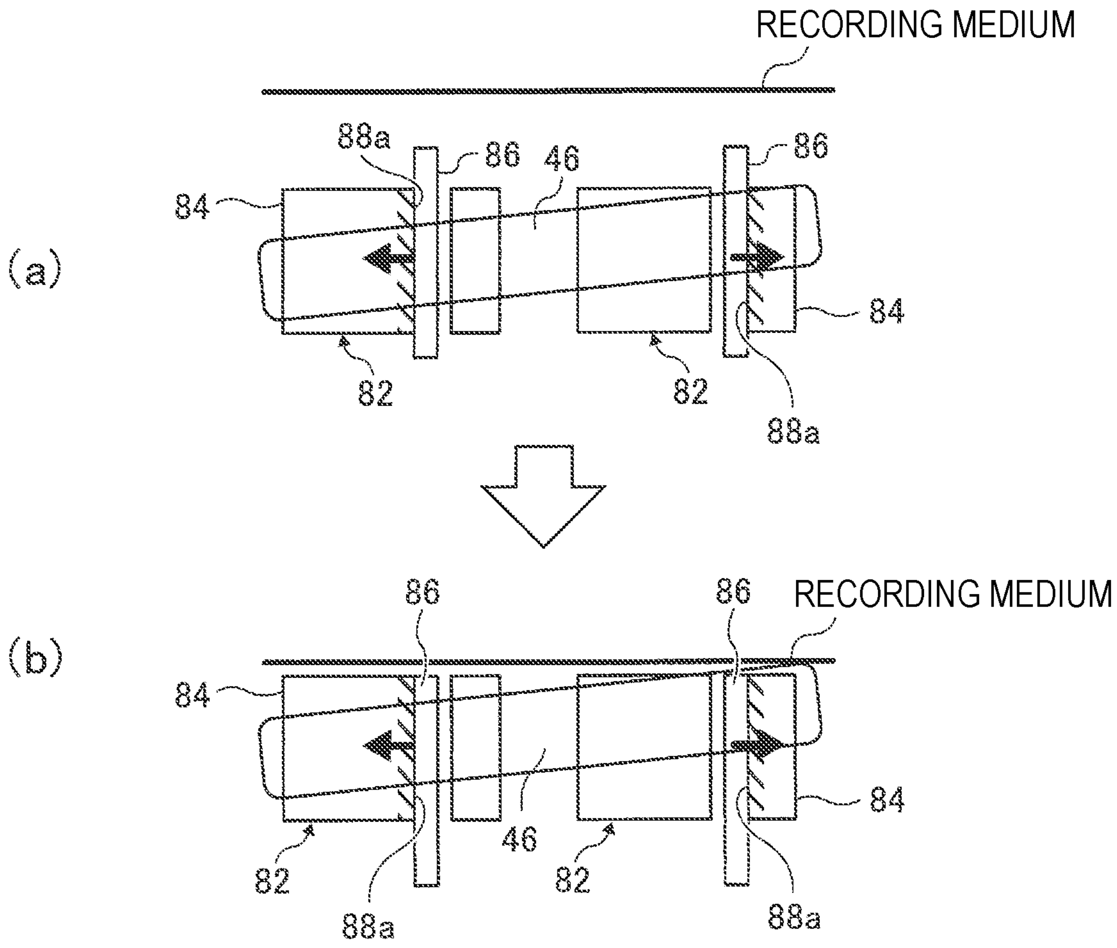
FIG. 11 is a schematic view showing a relationship between a movable body and an insertion portion according to a second exemplary embodiment of the present invention, in which (a) shows a state before start of a folding process of the recording medium, and (b) shows a state at the start of the folding process of the recording medium.

FIG. 11 shows a second exemplary embodiment of the present invention. In the second exemplary embodiment, in addition to the first exemplary embodiment described above, the blade 46 is obliquely fixed to the movable body 84 such that the counter-drive unit side of the blade 46 is closer to the recording medium than the drive unit side thereof. In the second exemplary embodiment, as in the first exemplary embodiment, the insertion portion 86 is pressed against the insertion hole 88*a*, but as another exemplary embodiment, the blade 46 may be only tilted without pressing the insertion portion 86 against the insertion hole 88*a*.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

REFERENCE SIGNS LIST

10 post-processing apparatus
12 image forming unit
14 side stitching processing unit
16 saddle stitching processing unit
18 recording medium carry-in port
20 first feed member
22 second feed member
24 first feed path
26 second feed path
28 side stitching temporary accumulation portion
30 side stitching stapler
32 bundle discharge device
34 side stitching discharge portion
36 position adjuster
38 saddle stitching temporary accumulation portion
40 holder
42 saddle stitching stapler
44 folding device
46 blade
48 opening portion
50 folding roll
52 discharge roll
54 saddle stitching discharge portion
56 pressing member
58 protruding portion
60 crank mechanism
62 first shaft
64 second shaft
66 third shaft
70 first link
72 second link
72 drive unit
74 arm portion
76 post-processing apparatus main body
78 first urging member
80 support frame
82 support portion
84 movable body
86 insertion portion
88*a*, 88*b* insertion hole
90 adjustment member
92 screw
94 second urging member
96 third urging member

What is claimed is:

1. A post-processing apparatus comprising:

a blade that is to be pressed against a recording medium at a folding position where the recording medium is to be folded; and a support portion that supports the blade, wherein the support portion comprises a movable body to which the blade is fixed and that moves together with the blade, and an insertion portion that is inserted into the movable body, and the insertion portion and one surface of the movable body are pressed each other.

2. The post-processing apparatus according to claim 1, further comprising:

a spring by which the insertion portion and the one surface of the movable body are pressed each other.

3. The post-processing apparatus according to claim 2, wherein the spring presses the insertion portion.

4. The post-processing apparatus according to claim 3, further comprising:

a drive unit configured to drive the movable body, wherein the drive unit is disposed at an end portion of the post-processing apparatus in a direction intersecting a folding direction to which the recording medium is to be folded by the post-processing apparatus.

5. The post-processing apparatus according to claim 2, wherein the spring presses the movable body.

6. The post-processing apparatus according to claim 5, further comprising:

a drive unit configured to drive the movable body, wherein the drive unit is disposed at an end portion of the post-processing apparatus in a direction intersecting a folding direction to which the recording medium is to be folded by the post-processing apparatus.

7. The post-processing apparatus according to claim 1, further comprising:

a drive unit configured to drive the movable body, wherein the drive unit is disposed at an end portion of the post-processing apparatus in a direction intersecting a folding direction to which the recording medium is to be folded by the post-processing apparatus.

8. The post-processing apparatus according to claim 2, further comprising:

a drive unit configured to drive the movable body, wherein the drive unit is disposed at an end portion of the post-processing apparatus in a direction intersecting a folding direction to which the recording medium is to be folded by the post-processing apparatus.

9. A post-processing apparatus comprising:

a blade that is to be pressed against a recording medium at a folding position where the recording medium is to be folded; and a support portion that supports the blade, wherein the blade is supported by the support portion so that the blade is to be inclined with respect to the recording medium, and the support portion comprises a movable body to which the blade is fixed and that moves together with the blade and an insertion portion that is inserted into the movable body, and the blade is fixed to the movable body so that a longitudinal direction of the blade is inclined to a longitudinal direction of the movable body.

10. The post-processing apparatus according to claim 9, further comprising:

a drive unit configured to drive the movable body, wherein the drive unit is disposed at an end portion of the post-processing apparatus in a direction intersecting a folding direction to which the recording medium is to be folded by the post-processing apparatus, and the blade is inclined such that an end portion of the blade on a side opposite to a side at which the drive unit is disposed approaches the recording medium.

11. An image forming apparatus comprising:

an image forming unit configured to form an image on a recording medium; and a post-processing apparatus configured to perform a post-processing on the recording medium on which the image is formed by the image forming unit, wherein the post-processing apparatus comprises a blade that is to be pressed against a recording medium at a folding position where the recording medium is to be folded, and a support portion that supports the blade, and wherein the support portion comprises a movable body to which the blade is fixed and that moves together with the blade, and an insertion portion that is inserted into the movable body, and the insertion portion and one surface of the movable body are pressed each other.

12. An image forming apparatus comprising:

an image forming unit configured to form an image on a recording medium; and a post-processing apparatus configured to perform a post-processing on the recording medium on which the image is formed by the image forming unit, wherein the post-processing apparatus comprises a blade that is to be pressed against a recording medium at a folding position where the recording medium is to be folded, and a support portion that supports the blade, the blade is supported by the support portion so that the blade is to be inclined with respect to the recording medium, and the support portion comprises a movable body to which the blade is fixed and that moves together with the blade and an insertion portion that is inserted into the movable body, and the blade is fixed to the movable body so that a longitudinal direction of the blade is inclined to a longitudinal direction of the movable body.

* * * * *